May 3, 1960

R. LUCIEN 2,935,277

BRACING-STRUT FOR AIRCRAFT

Filed May 3, 1955

2 Sheets-Sheet 1

May 3, 1960
R. LUCIEN
2,935,277
BRACING-STRUT FOR AIRCRAFT
Filed May 3, 1955
2 Sheets-Sheet 2
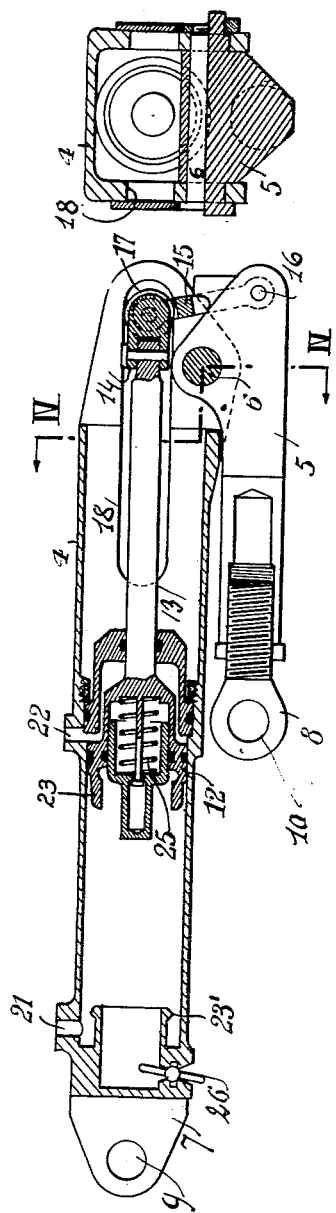

United States Patent Office 2,935,277
Patented May 3, 1960

2,935,277

BRACING-STRUT FOR AIRCRAFT

René Lucien, Paris, France, assignor to Societe d'Inventions Aeronautiques et Mecaniques S.I.A.M., Fribourg, Switzerland, a corporation of Switzerland Application May 3, 1955, Serial No. 505,806

Claims priority, application France December 27, 1954

4 Claims. (Cl. 244—102)

In aircraft provided with retractable landing-gear, a bracing-strut connected to a point on the frame of the aircraft, and also to a point on the landing-gear, maintains the latter in position when the aircraft is travelling over the ground, and the strut is arranged to pass with the landing-gear into the frame of the aircraft when retracted, thus eliminating all drag due to the landing-gear during flight.

The present invention has for its object a bracing-strut for the landing-gear of an aircraft, the said strut being of the type having two pivoted limbs and complying with the conditions referred to.

This bracing-strut is characterised in that one of its two arms includes a jack, the actuation of which for the purpose of retraction causes the two said limbs to fold one against the other, this folding movement causing in its turn the rotation of the landing-gear into its retraction position, whilst actuation of the jack in the opposite direction has the effect of bringing the bracing-strut into its extended position and the landing-gear into the landing-position.

Figure 1:
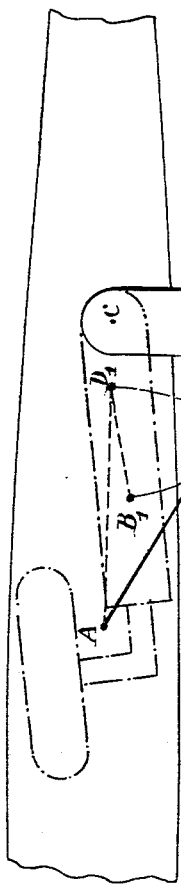

Fig. 1 of the attached drawings shows in diagrammatic form the relation between the bracing-strut, the landing-gear and the aircraft.

Figure 2:
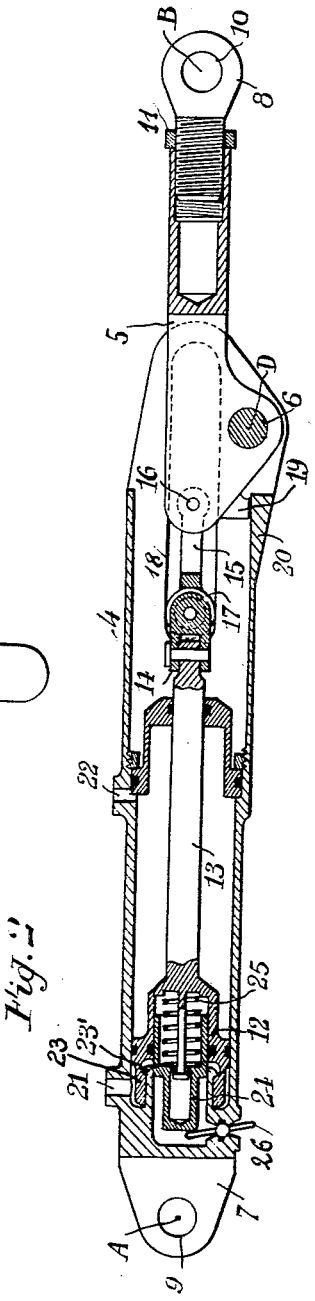

Figs. 2, 3 and 4 show respectively by way of example and not in any restrictive sense, a view in axial-section of the bracing-strut when extended, a corresponding view of the bracing-strut when folded and a view in cross-section following the line IV—IV of Fig. 3.

In Fig. 1, there has been shown diagrammatically at 1 the landing-gear, at 2 the wheel, and at 3 the bracing-strut. In this example, the landing-gear is pivotally attached at a point C on the wing, and the bracing-strut 3 is pivoted, on the one hand at a point B on the landing-gear and on the other hand, to a point A on the frame of the aircraft, for example a point on the wing. The bracing-strut in accordance with the invention could equally well be applied to the forward landing-gear of an aircraft, in which case the points A and C would be points on the fuselage.

The bracing-strut is formed by two arms AD and DB, one of which constitutes the body of a jack operated by compressed fluid. The arrangement is such that actuation of this jack disrupts the alignment ADB by a rotation of the arms DB and AD around the point D at the same time as the point D is raised; this rotation causes at the same time a rotation of the landing-gear 1 about the point C, the whole assembly being thus brought into the retracted position, as shown in chain-dotted lines in Fig. 1, the points B and D coming respectively into the positions $B_1$ and $D_1$.

Referring now to Figs. 2, 3 and 4, the bracing-strut is made-up as follows:

A main member 4 which, in the example considered, forms the body of the jack is pivotally connected to a two-armed lever so as to pivot about a shaft or pivot 6 which corresponds to the point D of Fig. 1. Each of the arm and lever carries a forked or pivotal member 7, 8, provided with laterally-drilled holes 9, 10, the axes of which correspond to the pivotal points A or B of Fig. 1. In the example shown, the axis 6 is located outside the line joining the pivotal points 9, 10.

The forked member 8 is screwed into the lever 5 which enables the length of the bracing-strut to be varied. A lock-nut 11 ensures the locking of the fork 8 in a suitable position.

A piston 12 is movably mounted inside the cylinder and carries a rod 13 which is pivoted at its extremity on a forked member 14, to which is hinged a link or crank-arm 15 which is pivotally-mounted in its turn on a pin 16 of the lever 5. The rod 13 of the piston 12 is guided on the one hand by the piston and, on the other hand by means of two rollers 17 mounted on the ends of the pivot of forked member 14 and crank arm 15. In the position shown in Fig. 2, the bracing-strut is shown in the extended position, with the landing-gear in the position for travel along the ground. The piston is at one of the end positions of its travel. In this position, an abutment 19 on a lateral extension of the lever 5 comes up against a reinforced part 20 of the main arm 4. By their construction, the longitudinal axes of the arm and lever form between them an obtuse angle of the order of 180°, so that longitudinal compression stresses applied to the bracing-strut by the weight of the aircraft and the shocks sustained during landing, force the abutment 19 against the part 20 and this prevents the lever 5 from folding.

In order to retract the landing-gear, fluid pressure is admitted through the orifice 21 and the orifice 22 is put to exhaust. The piston 12 then takes up the position shown in Fig. 3, causing the secondary arm 5 to rotate about the shaft 6 due to the thrust of the rod 13 on the crank-arm 15, until the folded position is reached, as shown in Fig. 3.

In its movement, the fork member 8 applies a tractive force to the landing-gear on which it is pivoted and raises the landing-gear by causing it to turn about its pivotal point C. The position shown in Fig. 3 corresponds to the landing-gear retracted. The actuation of the piston in the reverse sense returns the landing-gear to its landing position.

The jack may be provided with any interlocking device which rigidly locks the piston 12 in both its extreme positions, or only in one of these positions. In particular, a locking device of the claw type may be used as described by the Société d'Inventions Aeronautiques et Mécaniques (S.I.A.M.), in their United States Patents 2,221,979 and 2,297,902. A device of this kind can be seen in Figs. 2 and 3 of the present drawings. It locks the piston in the position which corresponds to the extended position of the bracing-strut (see Fig. 1), by means of the flexible claws 23 which snap over a bead 23' on an appendix in the piston 12. The action of the fluid under pressure admitted at 21 to raise the landing-gear, pushes back the slider 24 against the pressure of the spring 25. The piston then escapes from the claws 23 which bend, and it continues its travel under the action of the fluid under pressure.

A rocking lever 26 against which the slider 24 comes into contact at the end of its travel, closes an electrical contact which produces a warning signal to the pilot, that the bracing-strut is in the extended position and that, in consequence, the landing-gear is set for landing.

What I claim is:

1. In combination with an aircraft framework element and a retractable landing gear element, the landing gear element having raised and lowered conditions, a brace and control device comprising: a cylinder defining an axis, a piston in said cylinder and reciprocable in said cylinder between opposite extreme positions, a rod connected to said piston and reciprocable therewith along a determinable path of travel, a pivot fixed with respect to said cylinder, said pivot being substantially transverse to said path and spaced therefrom, a lever including a fixed lateral extension pivotal on said pivot to control the effective length of said device, and link means pivotally connected to said rod and to said lever for converting movements of said rod into pivotal movements of said lever; said lever and cylinder being respectively and pivotally connected to one of said elements, said rod, link means and lever being aligned on the cylinder axis with said piston in an extreme position corresponding to the lowered condition of the landing gear element.

2. In combination with an aircraft framework and a retractable landing gear element, a brace and control device having a first condition wherein said element is lowered and a second condition wherein said element is raised, said device comprising first and second pivotal members connected to said aircraft framework and element, respectively, a cylinder defining an axis and being connected to one of said members, a lever including two arms, one of which is connected to the other of said members, a pivot on said cylinder transverse to and spaced from said axis, said arms being pivotal in unison on said pivot, a pivot pin on the other of said arms, a piston reciprocable in said cylinder between positions corresponding respectively to said first and second conditions, a rod connected to said piston and extending externally of said cylinder, a pivot pin on said rod, and a link connecting said pivot pins, said rod and link having a length such that with the piston in the position corresponding to said first condition, the pivot pins and pivotal members are aligned on the axis of said cylinder, movement of said piston to the position corresponding to said second condition pivoting the pivotal member on said other arm about said pivot.

3. A device as claimed in claim 2 wherein said piston, in the position corresponding to said first condition, abuts against the cylinder so that a force acting along said rod in the direction of the piston is mechanically resisted by said cylinder.

4. A device as claimed in claim 3 wherein said piston, in the position corresponding to said second condition, acts through said rod and link to pivot said lever so that said one arm is moved to a position substantially along and parallel to said rod.

References Cited in the file of this patent

UNITED STATES PATENTS

| | | |
|---|---|---|
| 2,221,979 | Levy | Nov. 19, 1940 |
| 2,316,682 | Finnegan | Apr. 13, 1943 |
| 2,323,640 | Armstrong | July 6, 1943 |

FOREIGN PATENTS

| | | |
|---|---|---|
| 824,048 | France | Nov. 3, 1937 |
| 473,202 | Great Britain | Oct. 8, 1937 |
| 565,213 | Great Britain | Nov. 1, 1944 |
| 749,114 | Germany | Nov. 15, 1944 |